AUTOMATIC GAIN CONTROL CIRCUITS FOR DIRECTIVE RECEIVING SYSTEMS

Filed May 9, 1956 3 Sheets-Sheet 1

INVENTOR
W. L. MRAZ
BY George C. Lord
ATTORNEY

AUTOMATIC GAIN CONTROL CIRCUITS FOR DIRECTIVE RECEIVING SYSTEMS

Filed May 9, 1956

3 Sheets-Sheet 2

INVENTOR
W. L. MRAZ
BY George C. Lord
ATTORNEY

AUTOMATIC GAIN CONTROL CIRCUITS FOR DIRECTIVE RECEIVING SYSTEMS

Filed May 9, 1956 3 Sheets-Sheet 3

INVENTOR
W. L. MRAZ
BY George C. Ford
ATTORNEY

United States Patent Office 3,164,831

Patented Jan. 5, 1965

3,164,831
AUTOMATIC GAIN CONTROL CIRCUITS FOR DIRECTIVE RECEIVING SYSTEMS

William L. Mraz, Morris Plains, N.J., assignor to Bell Telephone Laboratories, Incorporated, New York, N.Y., a corporation of New York Filed May 9, 1956, Ser. No. 583,658
8 Claims. (Cl. 343—16)

This invention relates to improvements in automatic gain control systems and more particularly to improvements therein for receivers which are fed from steerable directive antennas.

In certain directive receiving systems, the input signal to the receiver undergoes amplitude variations due to antenna steering which are usually large enough to completely mask any variations of the radiation field from which it was obtained. Two examples of such systems are (1) radars, in which the masking variations are produced by irregularities in the automatic tracking of a moving object, and (2) direction finders, in which the variations are produced by trial and error steering movements of an antenna as it is controlled to orient (or reorient) a null of its receiving pattern with respect to a fixed signal source. Due to this predominance in the signal input, as applied to the receiver, of variations other than those which result from changes in field strength at the receiving point, a conventional automatic gain control system cannot be used. If a conventional system were designed with enough sensitivity to achieve a relatively constant signal output, the essential information derived from antenna steering would be completely obscured.

One way of avoiding this difficulty is to produce the needed gain control voltage in a separate receiver whose input comes from the same radiation field but is relatively free of the masking variations, e.g., because it is obtained over another antenna. For example, in a monopulse automatic tracking radar, the signal output of each difference channel receiver is strongly orientation sensitive, while the signal output of the sum channel receiver is relatively unaffected by normal orientation variations. Accordingly, the gain of each difference receiver may be controlled by the automatic gain control voltage of the sum channel receiver. However, this arrangement is far from satisfactory, since it does not afford a closed loop, negative feedback type of gain control circuit for the difference channel receiver. It therefore fails to provide the difference receiver with an additional important kind of compensation, namely, compensation for changes in its own performance, such as for a decrease in its amplification due to a loss of cathode emission in an amplifying tube. Moreover, at the same time that the gain adjustments imposed by such an arrangement on the difference channel receiver are thus undesirably independent of its own performance changes, they are quite dependent on those of the sum channel receiver. This is equally undesirable.

It is therefore an object of this invention to improve the automatic gain control systems of receivers in which the signal amplitude variations produced by antenna steering are much larger than those due to changes in field strength.

It is another object to improve such systems so that they comprise closed feedback loops for the controlled receivers.

In general, these objects are attained by deriving from the radiation field which feeds the directive antenna a control radio frequency signal whose amplitude undergoes variations due to changes in the field strength without these variations being masked, as they are in the intelligence input signal, by variations due to antenna steering. This radio frequency control signal is coupled to the direction sensitive intelligence input channel. In coupling the control signal to the direction sensitive input channel, the control signal is modulated in a characteristic manner to facilitate subsequent separation from the intelligence signal.

As applied to directional apparatus such as radar systems, an appropriate control signal may be introduced by supplying the system with an electrical signal corresponding to a slight shift in the orientation of the directional antenna. This is termed "boresight" modulation. In mono-pulse radars, for example, in which reflected energy is received through channels having slightly different reception patterns, such modulation can be accomplished by mechanically operated means which successively attenuates energy received by the channels. The boresight modulation is introduced at a frequency which is higher than the highest frequency of the intelligence signals caused by relative movement of target and antenna and may, for example, be one hundred cycles per second in a representative radar system. At the output of the angle detector the automatic gain control signal is separated from the tracking signal by a high pass filter, and is fed back to give precise gain control of the difference channel.

In a preferred form of the invention, the boresight modulation is introduced by a radio frequency crosstalk path between the input to the sum channel and the input to the difference channel of a radar system. The phase of the crosstalk path is varied periodically, and this phase shift has the effect of producing the desired boresight modulation.

Other objects and various advantages and features of the invention will become apparent by reference to the following description taken in connection with the appended claims and the accompanying drawings forming a part thereof.

Figure 1:
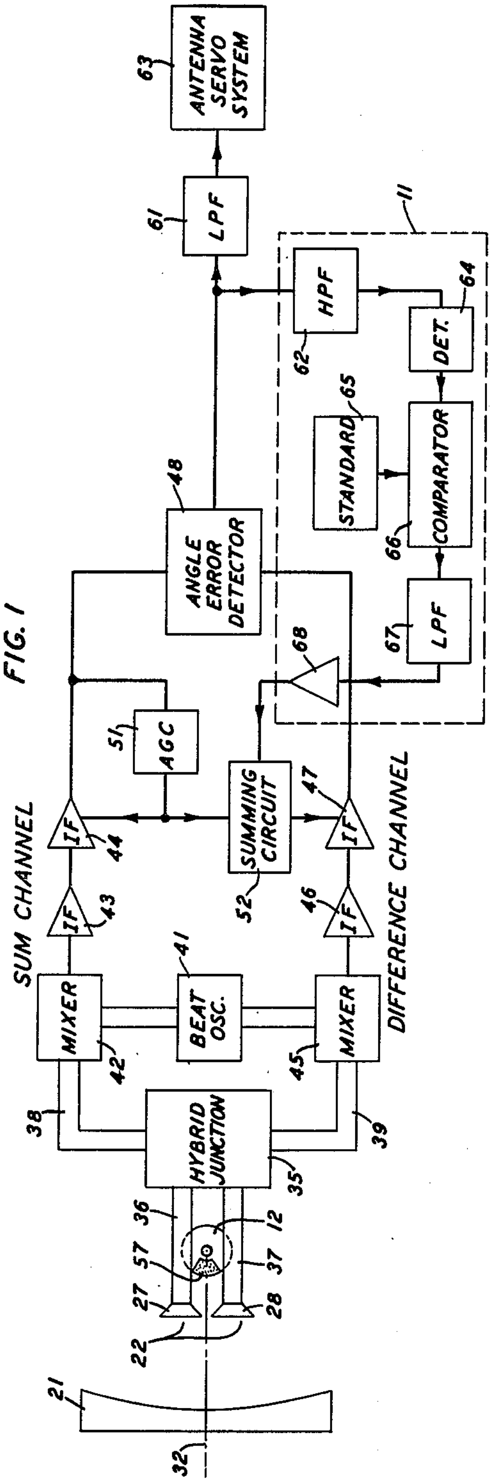
FIG. 1 illustrates a radar system including automatic gain control circuits in accordance with the invention.

With reference to the drawings, FIG. 1 shows, by way of example, the application of the principles of the invention to a monopulse radar system. In general, the radar receiver shown in FIG. 1 includes a steerable lens antenna 21 with the associated feedhorn array 22 feeding the wave guide inputs 38 and 39 of the sum and difference channels, the outputs of which are supplied to an angle error detector 48. In addition to these conventional components, however, the radar receiver of FIG. 1 includes an automatic gain control circuit 11 and means for introducing a reference gain control signal which is substantially independent of signal variations resulting from antenna steering. In the specific embodiment of FIG. 1, the reference gain control voltage is introduced by attenuator wheels 12 and 12' best shown in FIG. 2 which successively attenuate signals received by different pairs of feedhorns.

*Monopulse Radar System*

Before proceeding to consider the novel features of the invention in detail, a relatively brief description of the known properties of monopulse radar receivers will be set forth. Two patents which disclose monopulse radar systems are N. Fox, Patent 2,567,197, granted September 11, 1951, and N. S. Fox et al., Patent 2,687,520, granted August 24, 1954.

Figure 2:
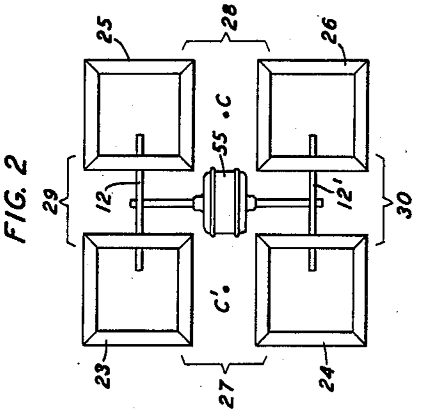
FIG. 2 shows one method of introducing a reference signal voltage for automatic gain control purposes.

In FIG. 1, the illustrated radar receiving system includes a steerable antenna 21 which may, for example, be a phase advance lens or other suitable field focusing means yielding a highly directive transmitting and receiving pattern. Referring to FIGS. 1 and 2, the lens 21 is fed from and feeds a square array 22 of four horns 23, 24, 25, and 26. In a monopulse radar system for determining both azimuth and elevation of the target, the four horns are grouped in pairs which act effectively as single horns feeding radio frequency energy into the receiving part of the radar system. In FIG. 2, the two horns 23 and 24 constitute a pair of horns which are identified as pair 27. Similarly, the right-hand pair of horns 25 and 26 are designated pair 28. The pairs of horns 27 and 28 are employed to provide two inputs for the part of the radar system shown in FIG. 1 which is adapted to convert the received signals into an output indicating azimuth angular tracking errors.

Another portion (not shown) of the radar receiving system which converts received signals into tracking errors of elevation receives energy from the upper pair of horns 29 (including horn 23 and horn 25), and the lower pair of horns 30 (including horns 24 and 26). The showing in the present specification of only one of the angular tracking portions of the radar receiver is adequate for present purposes, since the two portions are very much alike, both structurally and functionally.

The effective centers of sensitivity C, C' (FIG. 2) of the two pairs of horns 27, 28 occupy positions which are oppositely and equally spaced from the center axis 32 of the lens antenna 21. The axes of the two pairs of horns 27 and 28 therefore deviate slightly and equally away from each other and from the center axis and "line of sight" of the radar antenna. Accordingly, during the receiving part of each cycle, radio frequency echo pulses of equal magnitudes enter each of the pairs of horns 27, 28 when the object which is reflecting them lies on the axis 32 of the lens 21.

As shown in FIG. 1, the pairs of horns 27 and 28 are connected by the pairs of input wave guides 36 and 37 to a wave guide hybrid junction 35. As is well recognized in the art and discussed in the patents referred to previously, such a wave guide hybrid readily provides facilities for obtaining the desired sum and difference of the two-channel system. The structure illustrated in FIG. 1 is complete for measurements in one coordinate only. In a system for observing or tracking in both azimuth and elevation and employing four wave guide feeds, a more elaborate arrangement of wave guide junctions preferably with multiple hybrids would be required. For purposes of simplification, such a structure is not illustrated, as it is well known in the art. The input signals which pass over the two guides comprising each of the pairs 36 and 37 are combined additively in the junction 35, so that in effect the two guides in each pair act as one, just as do the two horns which feed them.

In the junction 35, the output to the sum channel 38 is produced by combining signals received by the pairs of horns 27 and 28 in phase, and the difference output to channel 39 is produced by combining them out of phase. Accordingly, all during tracking a continuous train of radio frequency pulses is received by the sum receiver. The difference receiver, however, receives none, except during transient intervals when angular tracking errors occur because of misalignment of the antenna axis with the reflecting target. For the durations of such intervals, short trains of radio frequency echo pulses are received by the difference channel which have (1) individual peak amplitudes which are proportional to the instantaneous magnitudes of the errors, and (2) carrier components which have respectively the same or opposite phase with respect to the carrier components of the signals simultaneously entering the sum channel, depending upon the directions of the angular errors.

The sum and difference channels share a common beat oscillator 41. In addition, the sum channel includes a mixer 42, an intermediate frequency preamplifier 43, and an intermediate frequency amplifier 44. The difference channel includes a comparable series of components: a mixer 45, the intermediate frequency preamplifier 46, and the intermediate frequency amplifier 47. The outputs of the sum and difference channels are connected to different inputs of the angle error detector 48. The detector 48 compares the phase of the signals from the difference channel with that of the signals from the sum channel, and produces output signals of positive or negative polarity depending upon whether the antenna is oriented to the right or left of the tracked object. In addition, the magnitude of the output of detector 48 depends on the magnitude of the tracking error.

The sum channel 38 may be provided with a conventional automatic gain control circuit such as that shown at 51 in FIG. 1. This circuit is coupled from the output of the intermediate frequency amplifier 44 back to control points within the intermediate frequency amplifier. The automatic gain control circuit 51 includes appropriate detection and rectification circuits in a manner which is well understood in the art.

*Difference Channel Gain Control*

Radar systems must respond to a wide range of input signal levels, and the requirements for automatic gain control circuits are therefore somewhat severe. For example, the automatic gain control circuit 51 compensates for input signal variations of up to ninety decibels. The difference channel 39 in the radar system of FIG. 1 is provided with approximately the desired automatic gain control from the sum channel gain control circuit 51, and is also provided with a "clean-up" gain control circuit 11. The signals from these two circuits are supplied to the summing circuit 52, and are applied to control the amplification of intermediate frequency amplifier 47.

The clean-up gain control circuit 11 which controls the gain of the difference channel normally has a control range of about thirty decibels, as contrasted with the ninety decibel range of the automatic gain control circuit 51 as noted above. This is sufficient to compensate for all deviations between sum and difference channel sensitivity short of actual disabling of one of the channels. If desired, the gain of the difference channel may be made entirely independent of the sum channel. Under these circumstances, the summing circuit 52 is eliminated, the gain of the amplifier 68 is increased, and it is connected directly to the intermediate frequency amplifier 47.

The difference channel gain control circuit 11 is responsive to the reference signal which may be introduced at the input to the radar receiver. As mentioned above, the reference signal simulates slight shifts in the orientation of the directive antenna relative to the target. These boresight deviation signals are introduced at a frequency which is higher than the highest frequency of the intelligence signal representing tracking deviations or tracking errors. The maximum angular deviation of the boresight modulation signals is constant and may, for example, be equal to about one degree shift in antenna orientation.

In the system shown in FIGS. 1 and 2, the boresight modulation is introduced by the two attenuation wheels 12 and 12' which are driven by a motor 55. The two wheels 12 and 12' carry sectors of attenuation material, and the sectors of attenuation material on the two wheels are displaced ninety degrees with respect to each other.

The attenuation sector 57 on wheel 12 is clearly shown in FIG. 1. The wheels 12 and 12' are mounted between the wave guide pairs 36 and 37, and each wheel extends through slots into one wave guide of each pair. This arrangement is clearly shown in FIG. 2, in which the edge of one wheel 12 may be seen extending into the wave guides connected to the horns 23 and 25, and the edge of the other attenuation wheel 12' may be seen extending into the wave guides connected to the horns 24 and 26. As the wheels 12 and 12' rotate, the energy transmitted through wave guide pairs 36 and 37 is alternately attenuated as the sectors of attenuation material successively project into the wave guide pairs. This periodic attenuation of the electromagnetic waves passing through the wave guide pairs introduces an apparent shift in the orientation of the target with respect to the antenna at a frequency corresponding to the frequency of rotation of the wheels 12 and 12'. In addition, the phase of the carrier components of the boresight modulation is shifted by one hundred and eighty degrees twice during each cycle of rotation of the attenuation wheels 12 and 12' as the sectors of attenuation material leave one pair of wave guides and enter the other pair.

Signals representing both the low frequency steering deviations and high frequency boresight modulation are present at the output from the angle error detector 48. These signals are separated by the low pass filter 61 and the high pass filter 62. The low frequency signals representing angle errors in steering are coupled from the low pass filter 61 to the antenna servo system 63. In many instances, the electrical and mechanical inertia of the antenna servo system 63 may be such that the low pass filter 61 is not required. The boresight modulation signals are separated from the low frequency steering errors by the high pass filter 62. They are rectified by the detector 64, compared with a standard value provided by the circuit 65 in the comparator 66, and transmitted through a low pass filter 67 and the amplifier 68 to the summing circuit 52.

As mentioned above, the maximum angular deviation of the higher frequency boresight modulation signals is constant. Therefore, when the signals reflected from a distant target become weaker, the boresight modulation signals undergo a corresponding reduction in amplitude. Similarly, if a tube in the intermediate frequency preamplifier 46, for example, should suddenly lose a significant portion of its amplification properties, the boresight modulation signals at the output of the angle error detector 48 would also be substantially reduced. A closed loop gain control circuit for the difference channel is thus provided. It is again emphasized that the present automatic gain control circuits properly compensate for deviations in amplification in the difference channel circuits, and that the gain of the difference channel is substantially unaffected by changes in amplification of the sum channel.

Figure 3:
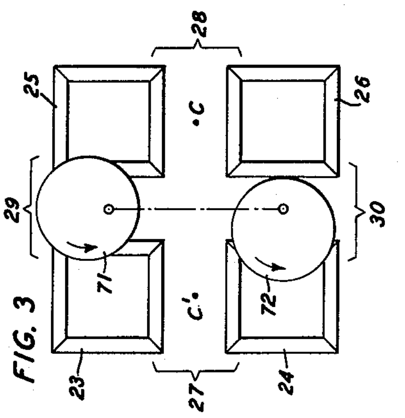
FIG. 3 shows an alternative method of introducing the reference signal.

FIG. 3 illustrates an alternative method for introducing boresight modulation. In the structure of FIG. 3, the discs 71 and 72 of conducting material are mounted eccentrically and are rotated to periodically reduce the gain of the left and right-hand pair of horns. The discs are mounted with the direction of maximum extent of disc 71 lagging ninety degrees behind the direction of maximum extent of the disc 72. Thus, as shown in FIG. 3, when the disc 72 is overlapping the horn 24 to the greatest extent, the other disc 71 is blocking equal small amounts of energy from horns 23 and 25. This has the same effect as that produced by the attenuation wheels 12 and 12' in the embodiment of FIG. 2.

It is interesting to note that in the arrangements of FIGS. 1 through 3, the fundamental frequency for the azimuth boresight modulation is equal to the frequency of rotation of the wheels 12, 12' or that of the discs 71 and 72. For the elevation system, however, the fundamental boresight modulation frequency is twice the frequency of rotation. The physical reason for this difference may be recognized by a consideration of FIG. 3. For azimuth purposes, the horns 23 and 24 are considered as a single pair 27, and the horns 25 and 26 are considered as a single pair 28; and the attenuation of either horn in a pair has the same effect. As the discs 71 and 72 rotate through successive quadrants, the disc 72 first blocks horn 24 of pair 27, and then disc 71 blocks horn 23 of the same pair 27, and then the two discs rotate to block energy from the two horns in the pair 28. For each complete cycle of rotation of the discs 71, 72, therefore, one complete cycle of boresight modulation is introduced.

In the case of the elevation boresight modulation, however, the upper horns 23, 25 are considered as one pair 29, and the lower pair of horns 24, 26 constitute the second pair 30. As the discs rotate, energy to the four horns 24, 23, 26, 25 is blocked, with the succession being indicated by the foregoing order of listing of the horn numbers. This corresponds to the successive reduction of energy received by the upper and lower pairs of horns 29 and 30 twice during each rotation of the discs 71, 72. Accordingly, the frequency of the elevation boresight modulation is twice that of the azimuth boresight elevation, and is also twice the frequency of rotation of the discs.

Figure 4:
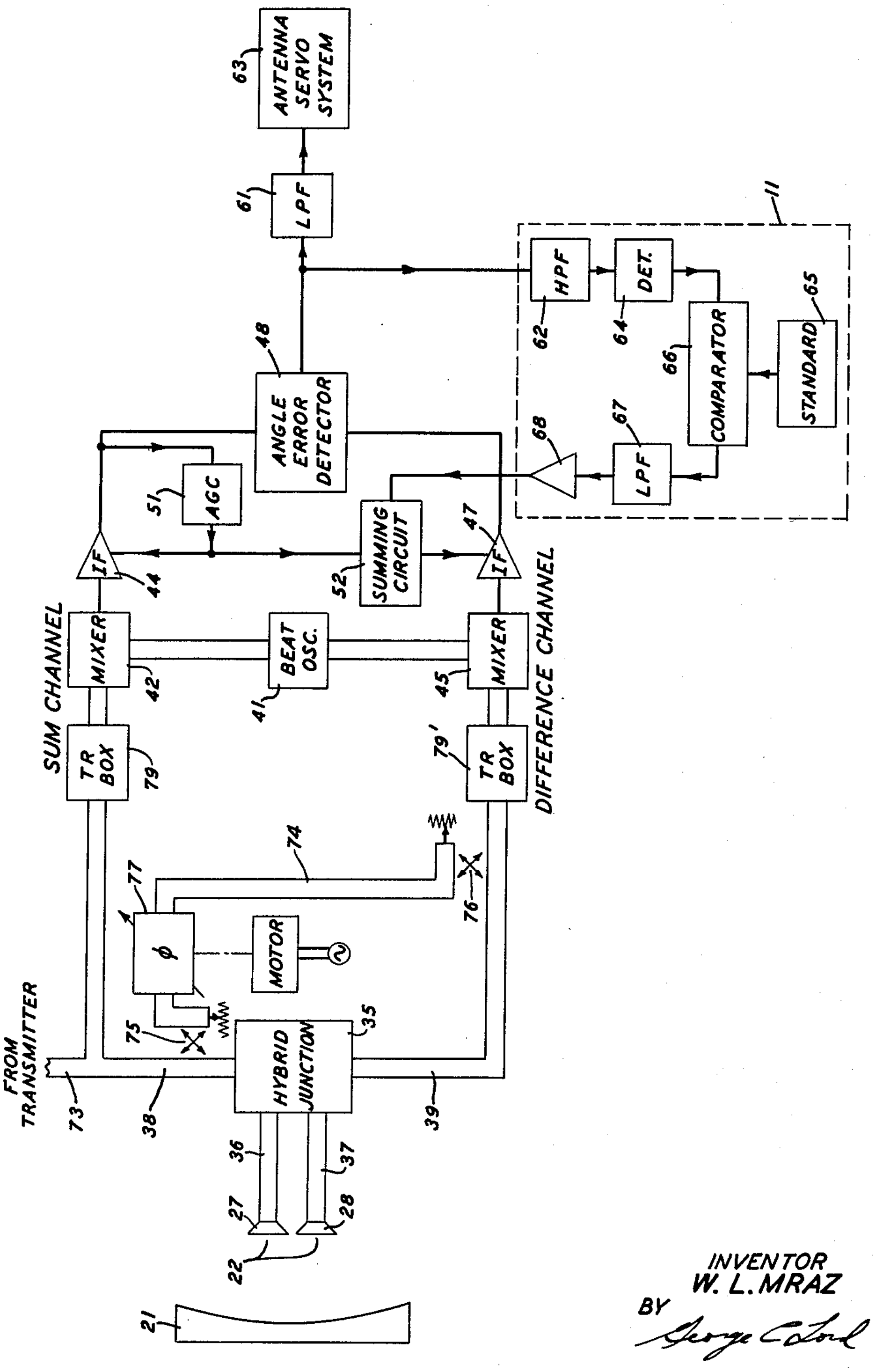
FIG. 4 represents a preferred embodiment of the invention and shows a monopulse radar system in which a control signal is introduced by a radio frequency crosstalk path including a periodically variable phase shifter.

FIG. 4 illustrates a preferred embodiment of the invention in which a radio frequency crosstalk path 74 between the sum and difference channels is employed to introduce boresight modulation. In FIG. 4, many of the components correspond to those shown in FIG. 1, and these corresponding components bear identical numbers. In addition, the wave guide connection 73 and two T–R boxes 79 and 79' are shown in FIG. 4. Following the hybrid junction 35 of FIG. 4, the radio frequency crosstalk path includes the directional coupler 75 connected to the sum channel 38. Energy from the sum channel is connected to the difference channel 39 by another directional coupler 76 after transmission through the crosstalk path 74, which includes a continuously driven variable phase shifter 77. The variable phase shifter 77 periodically varies the phase shift of the crosstalk path from zero to one hundred and eighty degrees at a frequency above that of normal steering deviations. This frequency corresponds to that of the resultant boresight modulation and may, for example, be one hundred cycles per second.

The equivalence of the radio frequency crosstalk circuit of FIG. 4 with the prehybrid attenuation circuits of FIGS. 1 through 3 will be evident from the following simplified mathematical analysis.

Let A and B be the inputs to a symmetrical amplitude hybrid comparator. Then the output would be $A+B$ for the sum and $A-B$ for the difference. In the case of prehybrid asymmetry, let A be modified by a factor $(1+2r)$, then the outputs from the hybrid will be as follows:

$$A(1+2r)+B \text{ for the sum output} \quad (1)$$
$$A(1+2r)-B \text{ for the difference output} \quad (2)$$

By adding $rB-rB$ to each of expressions (1) and (2), and rearranging terms, the outputs may be written:

$$(A+B)(1+r)+r(A-B) \text{ for the sum output} \quad (3)$$
$$(A-B)(1+r)+r(A+B) \text{ for the difference output} \quad (4)$$

These expressions show that a system with amplitude asymmetry before the hybrid comparator is equivalent to a system with symmetrical but attenuated inputs to the hybrid comparator and cross talk between the sum and difference channels.

Accordingly, the crosstalk path 74 of FIG. 4 has the effect of producing a slight shift in the boresight of the radar system. To make the boresight shift plus and minus with respect to the true boresight, the phase of the crosstalk signal is modulated from zero to one hundred and eighty degrees by the phase shifter 77. This boresight modulation is detected by the angle error detector 48 in a manner similar to that described above for the feedhorn modulation systems of FIGS. 1 through 3. This signal is then separated from steering errors by the high pass filter 62, compared with a standard reference voltage 65, and fed back to control the gain of the difference channel amplifiers. This system, like the feedhorn modulation system, compensates for drifts in gain of the entire difference channel including the mixer 45 and the intermediate frequency amplifier 47, and for shifts in gain of the angle error detector 48.

This method has a definite advantage over the feedhorn modulation method in that the modulation equipment is not operated in the main high power wave guide line, but rather in a branch tapped from this line. In addition, problems of power breakdown, overheating of the modulation element, pressurization restrictions, and difficulties in mechanical design are overcome by the crosstalk method.

To complete the discussion of boresight modulation in monopulse radar systems, it should be noted that boresight shifts may also be produced by crosstalk between the intermediate frequency portions of the sum and difference channels. It must be mentioned, however, that this method is not as effective as those described above, as it does not include compensation for mixers or intermediate frequency preamplifiers, the latter of which should precede the introduction of intermediate frequency crosstalk for noise figure considerations.

*Automatic Gain Control in Direction Finding Systems*

Figure 5:
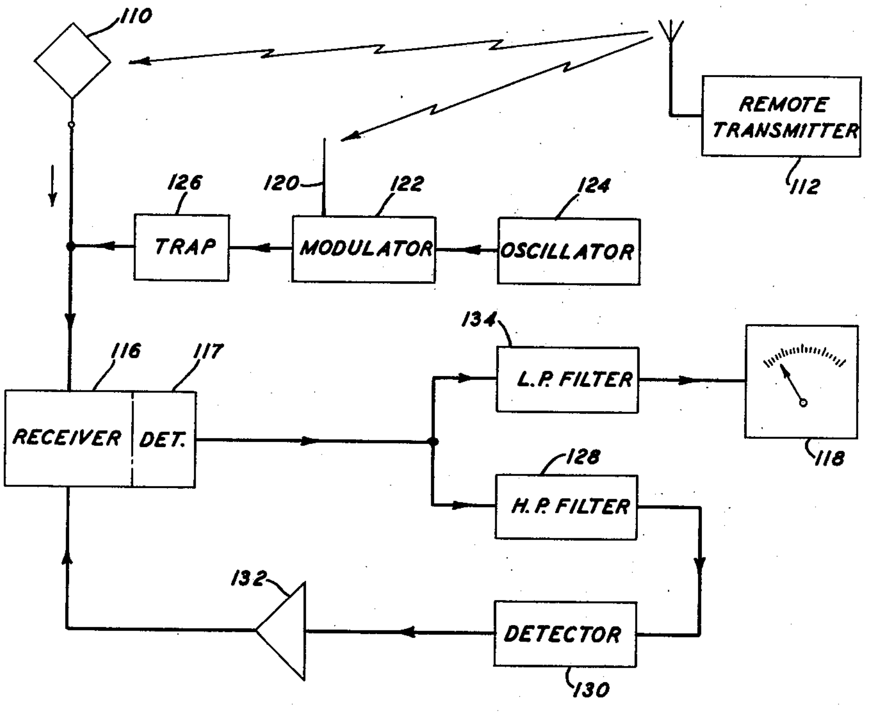
FIG. 5 illustrates the application of the principles of the invention to a direction finding apparatus.

Certain of the elements which appear in FIG. 5 comprise essential constituent parts of a known type of apparatus, i.e., a direction finder, with which other elements have been added and are shown in suitable association to embody one form of the present invention. Referring first to the elements comprising the direction finder itself and to the cooperation between them, a steerable directional antenna 110 serves to intercept signals from a remote transmitter 112 and to feed them to a receiver 116 which selectively amplifies them and detects amplitude variations impressed on them by antenna steering. A display device 118 produces visual indications of the variations to enable an operator to evaluate trial movements of the antenna and progressively make better ones until a sharp null or lobe of its receiving pattern is directed toward the transmitter 112.

Referring now to the elements comprising the present novel gain control system, a relatively nondirectional antenna 120 serves to derive from the field of the signals from the transmitter a radio frequency control signal whose amplitude modulations due to field strength changes are not masked to any substantial extent by amplitude modulations due to antenna steering. A modulator 122 mixes the control signal with a sinusoidal subcarrier wave which is provided by a local oscillator 124, and has a somewhat higher frequency than the spread between the carrier wave of the received signals and the highest significant side-band wave thereof which results from steering of the antenna 110. A trap 126 eliminates the original carrier and side-bands of the control signal from the output of the modulator 122, but permits the heterodyned control signal to enter the receiver together with the intelligence input signal from the directional antenna 110. As a result, both signals pass through the receiver 116 to its detector 117.

A high pass filter 128 selects from the total output of the detector only the amplitude modulation components of the control signal which have been heterodyned upward to include a principal wave of the same frequency as the subcarrier wave and a group of side-band waves adjacent thereto which vary in their total number and respective frequencies and amplitudes in accordance with the magnitude and rapidity of the field strength changes. Another detector 130 receives the output of the filter 128 and extracts the somewhat lower frequency modulation components carried thereby, these components comprising the desired control voltage. This voltage is fed back over a direct coupled amplifier 132 to one or more amplifying stages of the portion of the receiver 116 preceding its detector 117. In addition, a low pass filter 134 is employed between the detector 117 and the display device 118 for blocking the heterodyned modulation components of the control signal while passing the steering error signal. If the system is arranged so that the average amplitude of the output from the modulator 122 is very much lower than that of the information signal fed to the receiver from the antenna 110, this being possible within certain limits determined by the noise figure of the receiver 116 and the gain of the amplifier 132, it may be possible to dispense with the use of the low pass filter 134 and the trap 126. Or it may be dispensed with if the inertia of moving parts of the indicator 118 causes them to have an equivalent mechanical filtering action.

In the operation of the FIG. 5 apparatus, a control signal derived from the radiation field of the remote transmitter 112 and carrying amplitude modulations due to changes in the strength thereof is shifted slightly in frequency at the modulator circuit (122, 124, 126) so that in successively passing through the radio frequency and intermediate frequency pass bands of the receiver, it occupies respective off-center portions thereof not occupied by the information signal. Similarly, a complete group of modulation components of the control signal extracted at the detector 117 occupy a part of the detector pass band above that occupied by the steering error signal. These components are separated out by the filter 128 and utilized in the detector 130 and the amplifier 132 to produce a gain control voltage which does not degenerate the steering error signal variations. If desired, the frequency shift provided by the modulator circuit (122, 124, 126) may be such that the heterodyned control signal can be injected directly into the intermediate frequency portion of the receiver instead of into its "front end." However, in general, this is not to be preferred, since the radio frequency and mixer portions of the receiver (not separately shown herein) would then be outside of the closed feedback loop, and therefore it could not make gain adjustments to compensate for changes in their performance.

Figure 6:
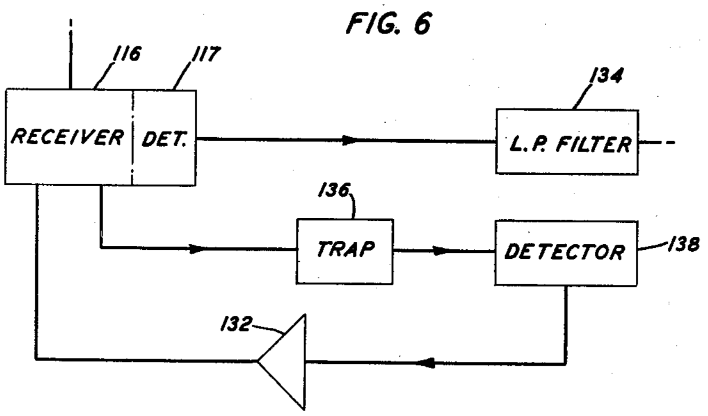
FIG. 6 is a variation of the circuit of FIG. 5.

FIG. 6 shows a modification of the portion of the FIG. 5 apparatus in which the control signal is more directly converted into a gain control voltage. According to this modification, the control voltage is selectively diverted from the signal channel of the receiver 116 at some point ahead of the detector 117, for example, from the output of one of its intermediate frequency amplifying stages, by the use of a suitable tuned circuit or "trap" 136. After being thus separated out, the control signal can be passed through a single detector 138 having an appropriate time constant and therefore output pass band, e.g., like that of the detector 130, to directly produce the gain control voltage. The rest of the closed loop, namely a feedback circuit which extends over the amplifier 132 to a gain control point of one or more amplifying stages in the receiver, may be the same as that shown in FIG. 1.

It is to be understood that the above-described arrangements are illustrative of the application of the principles of the invention. Numerous other arrangements may be devised by those skilled in the art without departing from the spirit and scope of the invention.

What is claimed is:

1. A monopulse radar system comprising a sum channel, a difference channel, means for providing a radio frequency crosstalk path including a variable phase shifter interconnecting said sum channel and said difference channel, means for periodically varying said phase shifter at a frequency higher than the frequency of the steering intelligence signals received by said radar system, an angle error detector coupled to said sum and difference channels, and automatic gain control circuit means coupled to the output of said angle error detector and responsive only to signals from said crosstalk path for generating a gain control voltage and applying it to said difference channel.

2. In combination, a steerable directive antenna for receiving signals from a remote object, a receiving apparatus coupled to said antenna for amplifying signal variations resulting from changes in the relative orientation of said antenna and said remote object, said signal variations being confined to a low frequency band, means at said receiving apparatus for generating from the signals from said remote object boresight modulated signals for application to said receiving apparatus at a frequency above said frequency band, means for selectively detecting said boresight modulation signals coupled to the output of said receiving apparatus, and means for controlling the gain of said receiver in accordance with said detected signals.

3. In a receiving system which includes a radio receiver and a steerable directive antenna for feeding it with an intelligence radio frequency input derived from radiations from a remote point, said input carrying first and second amplitude modulations produced respectively by deviations in the orientation of said antenna with respect to said point and spurious variations in the field strength of said radiations, an automatic gain control system comprising means for deriving from said radiations a control radio frequency signal which carries amplitude modulations corresponding only to the variations in field strength, means for modulating the control signal at a frequency greater than the frequency ranges of either of said modulations, means for feeding said modulated control signal into the receiver for amplification therein with the intelligence input, means for selectively detecting the amplified control signal to produce a gain control voltage, and means for varying the gain of the receiver under control of said voltage.

4. In a receiving system which includes a radio receiver and a steerable directive antenna for feeding it with an intelligence radio frequency input derived from radiations from a remote point, said input carrying first and second amplitude modulations produced respectively by inaccuracies in the steering of said antenna toward said point and spurious variations in the field strength of said radiations, an automatic gain control system comprising means for deriving from said radiations a control radio frequency signal which carries amplitude modulations like the second amplitude modulations of the intelligence input but substantially none like its first modulations, means for modulating the control signal at a frequency greater than the frequency ranges of either of said modulations, means for feeding said modulated control signal into the receiver for amplification therein with the intelligence input, detector means in association with a frequency selective means which is adapted to distinguish between signals occupying predetermined bands whose center frequencies differ by the amount of said greater frequency for selectively detecting the amplitude modulations of the amplified control signal to produce a gain control voltage, and means for varying the gain of the receiver under control of said voltage to offset effects produced at the receiver output by the second modulations of the intelligence input.

5. In a receiving system which includes a radio receiver and means for deriving a radio frequency signal from a signal radiation field to feed it into said receiver for amplification and detection and in which said signal, as fed to said receiver, carries intelligence denoting amplitude modulation components in a predetermined frequency range, and said field is subject to spurious changes in strength which causes said derived signals to carry additional amplitude modulation components in a frequency range which may be near to and even largely overlap the first-mentioned range, an automatic gain control system comprising means for deriving from said field a control radio frequency signal which carries components like the second-mentioned ones carried by the intelligence signal but substantially none like the first-mentioned components carried thereby, means for heterodyning said control signal to shift the frequency of respective components thereof by an amount at least as great as said first range, means for feeding said heterodyned signal into the receiver for amplification therein with the intelligence signal, means for selectively detecting said control radio frequency signal after amplification thereof in the receiver to produce a gain control voltage, and means for feeding back said voltage to said receiver to vary the gain thereof to offset effects of said field strength changes.

6. In a receiving system including a radio receiver and means for deriving an intelligence radio frequency signal from a signal radiation field to feed it into the receiver, said signal comprising a pulse carrier and carrying intelligence denoting amplitude modulation components and additional amplitude modulation components due to spurious changes in the strength of said field, the frequency ranges of said first and second components being very much smaller than the bandwidth of the unmodulated pulse carrier, an automatic gain control system comprising means for deriving from said field a control radio frequency signal which carries amplitude modulations like said additional modulations of the intelligence signal but substantially none like its intelligence modulations, means for modulating said control signal to vary its amplitude at a frequency greater than the frequency range of said additional modulations and to shift the phase of its carrier components by one hundred and eighty degrees at the end of each half cycle of the variations in amplitude, means for feeding the modulated control signal into the receiver for amplification therein with the intelligence signal, a phase sensitive detector for converting the amplified intelligence and control signals into low and high frequency amplitude modulated signals, respectively, means for selectively deriving from the output of the phase sensitive detector said modulations of the control signal to produce a control voltage, and feedback means for varying the gain of the receiver with said control voltage.

7. A gain control system for a radio receiver fed with an input signal from a variable gain antenna comprising means for deriving from the radiation field of the input signal a control signal the amplitude of which varies substantially only in accordance with variations in the strength of the field, modulating means for translating the modulation components carried by the control signal into a band well separated from that of modulation components carried by said input signal due to variations in antenna gain, means for feeding the modulated control signal into the receiver for amplification therein with the input signal, means for selectively detecting the amplitude modulation components of the amplified control signal to produce a voltage which varies in accordance with the variations in field strength, and means for controlling the gain of the receiver with said voltage.

8. In a monopulse radar system having a hybrid junction which is fed with an input signal over respective pairs of inputs from an antenna and combines them to provide sum and difference signals to respective sum and difference receivers of the receiving portion of the radar, and in which the difference signal normally thus produced during tracking comprises a discontinuous train of echo pulses which carry amplitude modulations corresponding to irregularities in automatic tracking, a gain control system comprising means for modulating the input signal in the respective pairs of inputs to effect sinusoidal amplitude modulation of said train of echo pulses and to alternately shift the carrier components thereof by one hundred and eighty degrees in synchronism with the start of each half cycle of the sinusoidal modulation, the sinusoidal modulation being at a frequency substantially higher than the highest component of said amplitude modulations, a phase sensitive detector having its phase reference input connected to the output of the sum receiver and its signal input connected to the output of the difference receiver, filter means for selectively passing components of the output of the phase sensitive detector whose frequencies are in a predetermined band centered about the frequency of said sinusoidal modulations, a detector for deriving a gain control voltage from the last-mentioned components and means for feeding back the gain control voltage to vary the gain of the difference channel receiver.

References Cited in the file of this patent

UNITED STATES PATENTS

| | | |
|---|---|---|
| 1,916,358 | Bruce | July 4, 1933 |
| 2,252,811 | Lowell | Aug. 19, 1941 |
| 2,279,031 | Cockerell | Apr. 7, 1942 |
| 2,422,096 | Hansell | June 10, 1947 |
| 2,477,028 | Wilkie | July 26, 1949 |
| 2,637,028 | McIlwain | Apr. 28, 1953 |
| 2,759,154 | Smith | Aug. 14, 1956 |